United States Patent

Serizawa et al.

[11] Patent Number: 6,029,098
[45] Date of Patent: Feb. 22, 2000

[54] NUMERICAL CONTROLLER FOR AUTOMATIC AXIAL FEED

[75] Inventors: Takehiko Serizawa; Jun Fujita, both of Mishima, Japan

[73] Assignee: Toshiba Kikai Kabushiki Kaisha, Tokyo, Japan

[21] Appl. No.: 08/895,239

[22] Filed: Jul. 16, 1997

[30] Foreign Application Priority Data

Jul. 24, 1996 [JP] Japan ................................. 8-194465

[51] Int. Cl.[7] ................................. G06F 19/00; G06G 7/66
[52] U.S. Cl. ...................... 700/188; 700/146; 700/170; 408/3
[58] Field of Search .................... 364/474.3, 474.12, 364/474.02; 408/3

[56] References Cited

U.S. PATENT DOCUMENTS

5,538,369  7/1996  Okuda ............................... 408/3

Primary Examiner—William Grant
Assistant Examiner—Ramesh Patel
Attorney, Agent, or Firm—Fish & Richardson P.C.

[57] ABSTRACT

A numerical controller controls a machine tool to achieve a tapping operation with high accuracy and satisfactory quality without being constrained by a set axial feed distance and a specified axial feed speed. An analyzing unit (4B) calculates a minimum axial feed distance ($L_{min}$) necessary for securing a constant machining program set in an input unit (7). A speed pattern adjusting unit (4C) modifies the axial feed speed pattern so that the constant speed time (T) can be secured. An(??) distributing unit (4A) determines drive instructions for a synchronous tapping operation. A drive control unit (5) gives the drive instructions to servomotors included in a driving unit (3).

6 Claims, 10 Drawing Sheets

NUMERICAL CONTROLLER FOR AUTOMATIC AXIAL FEED

BACKGROUND OF THE INVENTION

The present invention relates to a numerical controller and, more particularly, to a numerical controller capable of controlling a numerically controlled machine tool (hereinafter referred to as "NC machine tool") for automatic axial feed in an axial direction of a spindle synchronous with a rotation of the spindle.

Figure 10A:
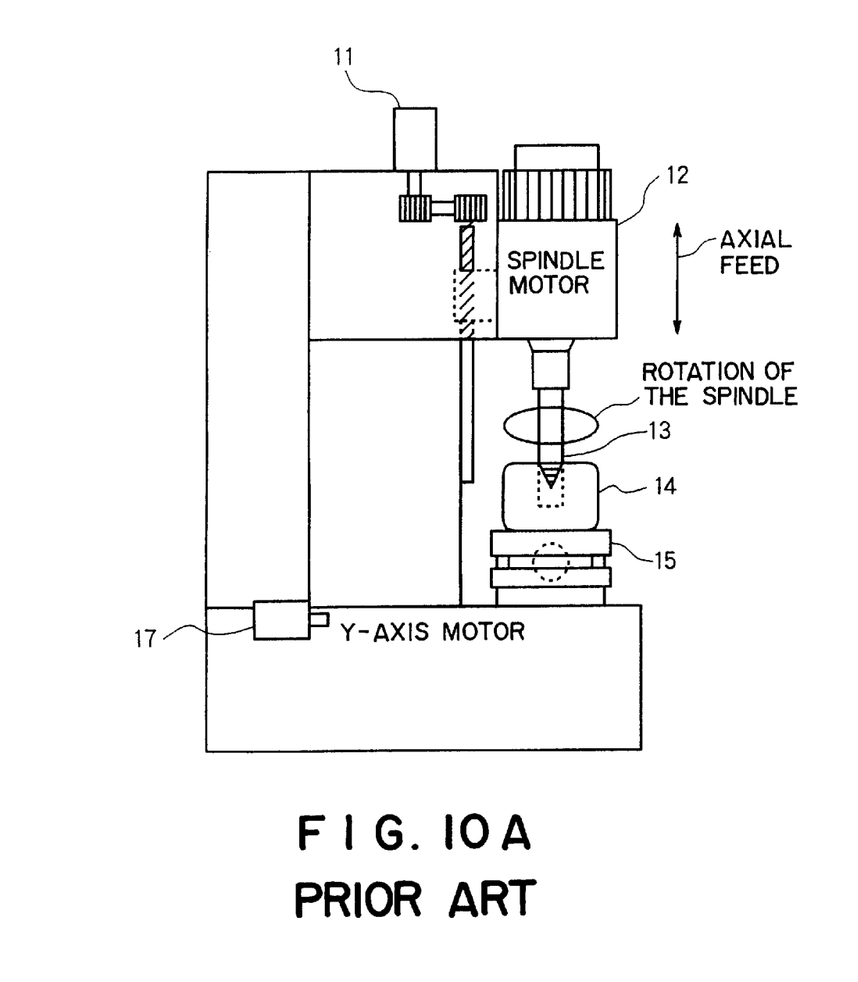
FIGS. 10A and 10B are a side view and a front view, respectively, of a NC machine tool capable of carrying out a snychronous tapping operation.
Figure 10B:
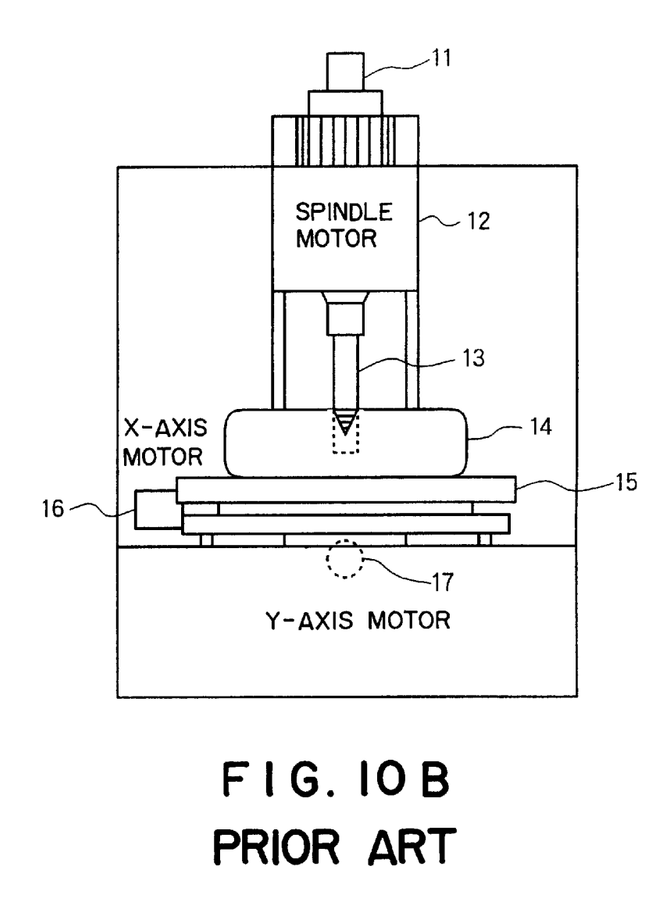

Referring to FIGS. 10A and 10B showing a NC machine tool capable of axially feeding a tool in synchronism with the rotation of a spindle for tapping in a side view and a front view, respectively, a spindle motor 12 drives a spindle to rotate a tool 13. A Z-axis motor 11 feeds the tool 13 axially, i.e., along a Z-axis, to tap a workpiece 14. A table 15 is moved horizontally by an X-axis motor 16 and a Y-axis motor 17. The machining operation of the NC machine tool is controlled by a numerical controller.

When carrying out an automatic machining operation, in which the tool 13 is fed axially in synchronism with the rotation of the spindle, a rotating speed N for the spindle, a specified (instructed) axial feed speed $F_c$, an axial feed distance L and an accelerating/decelerating time $t_a$ are specified, and an axial feed speed pattern is determined on the basis of the axial feed distance L.

Figure 11:
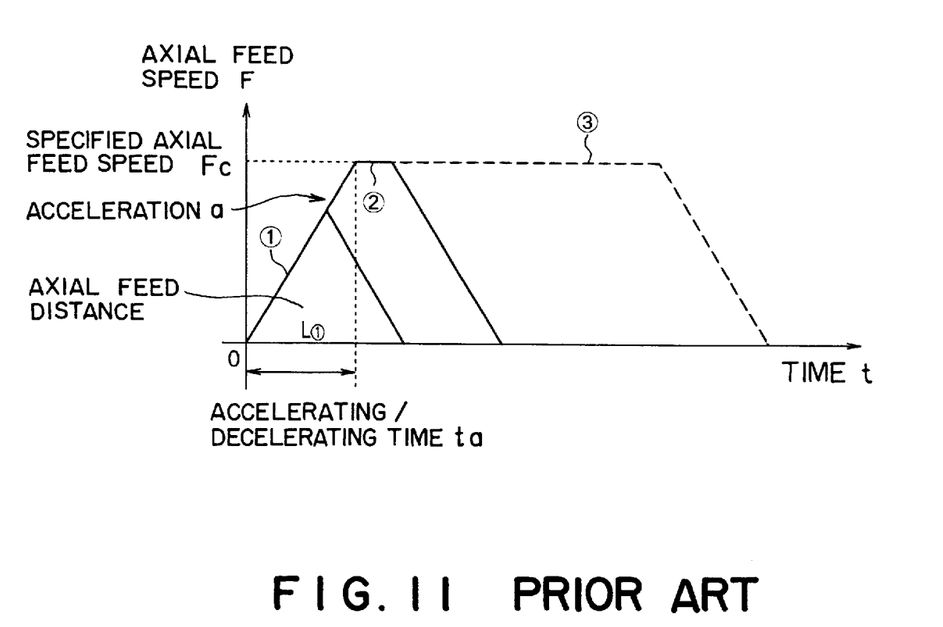
FIG. 11 is a diagram showing an axial feed speed pattern having constant acceleration and constant deceleration sections.

FIG. 11 is an axial feed speed pattern including sections for constant acceleration and constant deceleration.

The spindle motor 12 drives the spindle for rotation, and the Z-axis motor 11 feeds the rotating tool 13 along the Z-axis. FIG. 11 shows the variation of axial feed speed F with time t. A curve ③ in FIG. 11 indicates a normal axial feed speed pattern by way of example. The curve ③ shows axial feed of the tool 13 for a sufficiently long time at a fixed axial feed speed, i.e., the specified axial feed speed $F_c$.

A conventional NC machine tool, in some cases, is unable to achieve normal axial feed of the tool under some conditions on a specified axial feed speed pattern. In a condition indicated by a curve ① in FIG. 11 for instance, an axial feed distance L is excessively short for a specified axial feed speed $F_c$ and a specified acceleration a, and the tool is decelerated before the tool is accelerated to the specified axial feed speed $F_c$. In a condition indicated by a curve ② in FIG. 11, the tool is accelerated to the specified axial feed speed $F_c$ and is moved at the specified axial feed speed $F_c$ only a short time.

In the conditions indicated by the curves ① and ②, acceleration greatly varies and errors in the synchronization of the axial feed speed and the rotating speed of the spindle increases. Consequently, the accuracy and quality of tapping are deteriorated. In some cases, the accuracy and quality of tapping are deteriorated by a specified speed and a specified axial feed distance

SUMMARY OF THE INVENTION

Accordingly, it is an object of the present invention to actualize a high-accuracy and high-quality tapping operation hardly affected by a specified axial feed speed $F_c$ and a specified axial feed distance L. That is, it is an object of the present invention to achieve a high-accuracy and high-quality tapping operation by securing a sufficient time for axial feed at a constant axial feed speed and reducing errors in synchronization even if operating conditions are set such that the axial feed operation is decelerated before the axial feed speed reaches the specified axial feed speed $F_c$ because the axial feed distance L is excessively short relative to the specified axial feed speed $F_c$ as indicated by the curve ① in FIG. 11 or a short time for axial feed at the specified axial feed speed $F_c$ is excessively short as indicated by the curve ② in FIG. 11.

In view of the foregoing problems in the prior art, the present invention uses a system parameter specifying a time for maintaining a constant axial feed speed of the spindle (hereinafter referred to as "a constant ensuring speed time T", for which a constant axial feed speed is maintained) in addition to system parameters specifying acceleration a and accelerating/ decelerating time $t_a$ for a synchronous axial tool feed operation, i.e., an operation for axially feeding a tool in synchronism with the rotation of the spindle. According to the present invention, a specified acceleration a and a specified axial feed distance L are kept unchanged, and a specified axial feed speed pattern is changed so as to meet a specified "constant speed time T" to suppress error in the synchronization of the axial feed of the tool with the rotating speed of the tool.

According to a first aspect of the present invention, a numerical controller for controlling a machine tool which feeds a tool in an axial direction of a spindle synchronously with a rotation of the spindle for machining a work, the numerical controller comprises:

an input unit for inputting machining instructions including an axial feed distance of the spindle, and for setting system parameters including a time for maintaining a constant axial feed speed of the spindle;

an analyzing unit for determining a minimum feed distance necessary for machining on the basis of said machining instructions and said system parameters, and for comparing said feed distance included in machining instructions with the minimum distance;

a speed pattern adjusting unit for changing an axial feed speed pattern specified by the machining instructions to an adjusted axial feed speed pattern having a constant speed time longer than said time for maintaining a constant axial feed speed on the basis of the results of comparison made by the analyzing unit;

a distributing unit for calculating and outputting driving instructions according to said adjusted axial feed speed pattern changed by said speed pattern adjusting unit on the basis of the result of comparison made by the analyzing unit; and a drive control unit for controlling a driving unit on the basis of the driving instructions by said distributing unit.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 1:
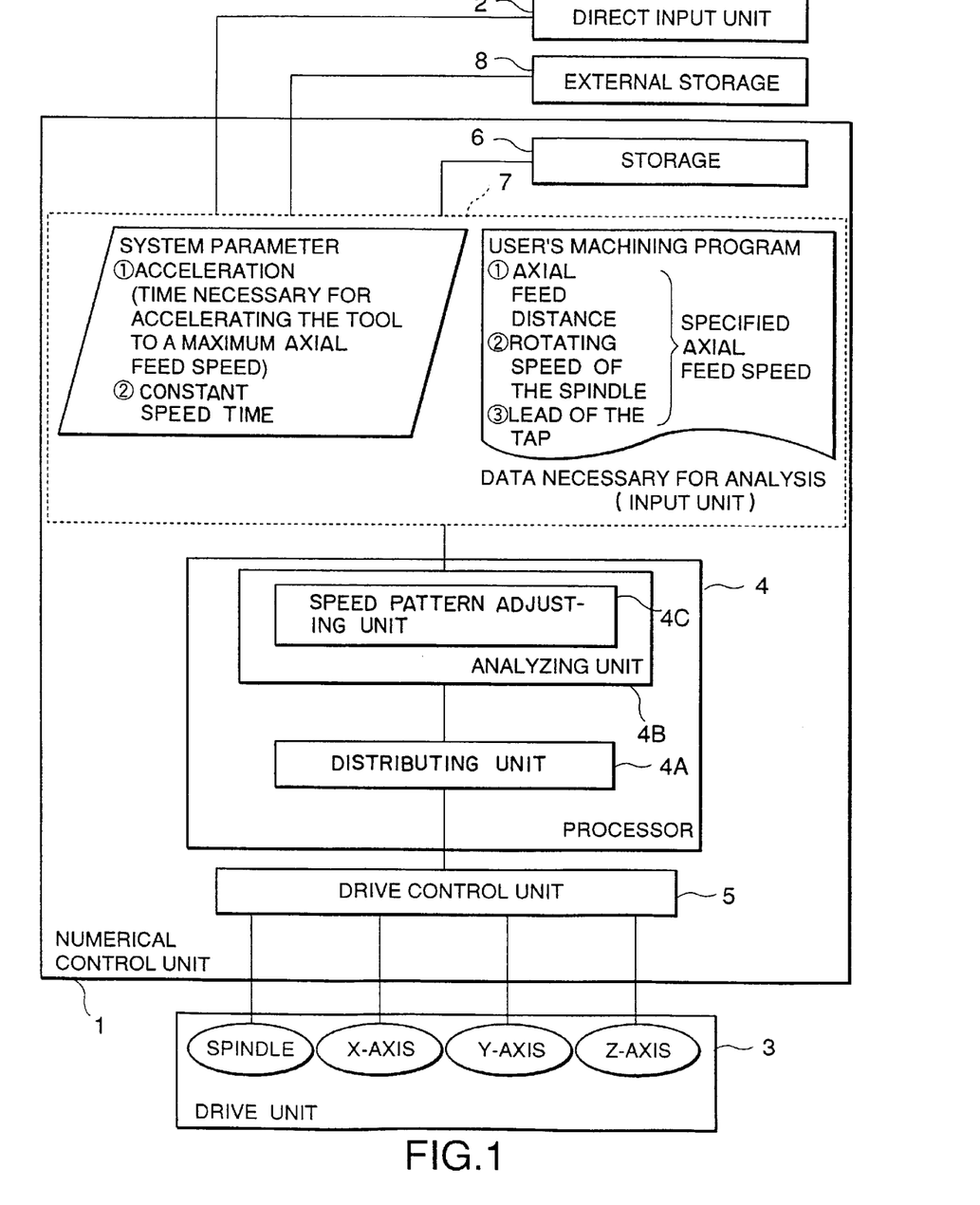
FIG. 1 is a block diagram of a numerical controller in a preferred embodiment according to the present invention.

A numerical controller in a preferred embodiment according to the present invention shown in FIG. 1 is applied to the NC machine tool to control the NC machine tool, for example, shown in FIG. 10, for a synchronous tapping operation. Referring to FIG. 10, a spindle motor 12 drives a spindle holding a tapping tool 13 for rotation to rotate the tool 13, and a Z-axis motor 11 drives the rotating spindle for the axial feed of the tapping tool 13 to tap a workpiece 14. The tapping tool 13 is axially fed in synchronism with the rotation of the spindle (synchronous tapping tool feed operation) so that a predetermined internal thread is formed in the workpiece 14. An X-axis motor 16 and a Y-axis motor 17 drives a table 15 for movement along an X-axis and a Y-axis, respectively, to position the workpiece 14 held on the table 15 properly. The numerical controller controls those machining operations of the NC machine tool.

Referring to FIG. 1, the numerical controller of the present invention comprises a numerical control unit 1, a direct input unit 2, and an external storage 8. The numerical controller controls a driving unit 3 included in the NC machine tool. The numerical control unit 1 comprises a processor 4, a drive control unit 5, a storage unit 6 and an input unit 7. The processor 4 includes an distributing unit 4A, and an analyzing unit 4B including a speed pattern adjusting unit 4C. A machining program (machining instructions) defining an axial feed distance necessary for analysis and system parameters are set in the input unit 7. The system parameters include acceleration a (or time $t_a$ necessary for increasing the axial feed speed to a specified axial feed speed) and a constant speed time T. An axial feed distance L, and rotating speed N rpm of the spindle and the lead B mm/turn. A specified axial feed speed $F_c$ is calculated by using an expression:

$$F_c(\text{mm/min}) = N \text{ (rpm)} \times B \text{ (mm/turn)}$$

A machining instruction for moving the spindle, necessary for analysis, and system parameters are data given directly by operating the direct input unit 2, data stored in the storage 6 or data stored in the external storage 8. The selection of the source of the data is dependent on the system and the operating mode of the numerical controller.

The analyzing unit 4B calculates the specified axial feed speed $F_c$ by using the foregoing expression and the machining instructions. The analysis unit 4B calculates also a minimum axial feed distance $L_{min}$ necessary for holding the specified axial feed speed $F_c$ for the constant speed time T on the basis of the machining instructions and the system parameters. The analyzing unit 4B has the speed pattern adjusting unit 4C which executes calculations (analysis) necessary for modifying an axial feed speed pattern. The speed pattern adjusting unit 4C compares the minimum axial feed distance $L_{min}$ and a specified axial feed distance L. If the minimum axial feed distance $L_{min}$ is greater than the specified axial feed distance L, the axial feed speed pattern is modified. If the minimum axial feed distance $L_{min}$ is not greater than the specified axial feed distance L, the axial feed speed pattern is not modified.

The distributing unit 4A periodically calculates a drive instruction (position instruction), and every time data about the spindle and other shafts are sampled to provide the drive instructions periodically. For example, the spindle is driven at a rotating speed N specified in the machining program if a synchronous tapping operation is possible under set conditions. If an adjusted axial feed speed pattern modified by the speed pattern adjusting unit 4C is used for a synchronous tapping operation, the rotating speed N of the spindle is determined properly so that the tapping operation is carried out according to an adjusted machining program including, e.g., adjusted specified axial feed speed F', and the axial feed of the tapping tool 13 is controlled for a synchronous tapping operation. Consequently, an internal thread of a desired pitch and a desired length can be formed in the workpiece 14 by a synchronous tapping operation.

The processor 4 carries out the foregoing procedure to adjust the axial feed speed pattern so that the constant speed time T can be secured.

The drive control unit 5 controls the spindle motor 12, the X-axis motor 16, the Y-axis motor 17 and the Z-axis motor 11 according to drive instructions given periodically thereto every time the sampling operation is carried out.

The storage 6 and the external storage 8 store user's machining programs and data.

The direct input unit 2 gives the machining program, the system parameters and data to the numerical control unit 1. The machining program including machining instructions is produced by the user to define desired machining operations, and is stored in the numerical controller.

The driving unit 3 is incorporated into the NC machine tool of FIG. 10 and includes the spindle motor 12, the X-axis motor 16, the Y-axis motor 17 and the Z-axis motor 11, which are servomotors. The driving unit 3 drives the spindle motor 12, the X-axis motor 16, the Y-axis motor 17 and the Z-axis motor 11 according to instructions given thereto from the drive control unit 5.

Figure 2:
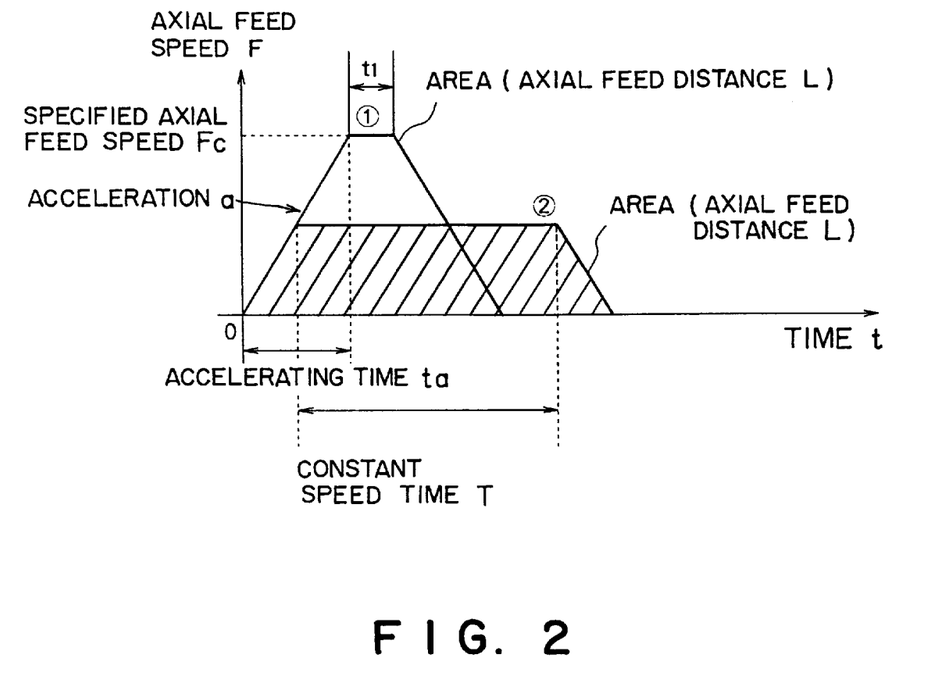
FIG. 2 is a diagram of assistance in explaining an axial feed speed pattern and an adjusted axial feed speed pattern.

FIG. 2 is a diagram showing, by way of example, axial feed speed patterns ① and ② prescribing the variation of the axial feed speed F at which the tapping tool 13 is fed axially along the Z-axis with time t. In FIG. 2, the axial feed speed F is measured on the vertical axis and time t is measured on the horizontal axis. Each of the axial feed speed patterns ① and ② shown in FIG. 2 has a constant acceleration section and a constant deceleration section. In FIG. 2, areas respectively enclosed by the axial feed speed patterns ① and ② and the horizontal axis are axial feed distances by which the tapping tool 13 is advanced.

The axial feed speed pattern ① indicates that the tapping tool 13 is accelerated at an acceleration a for an accelerating time $t_a$ to the specified axial feed speed $F_c$. The specified axial feed speed $F_c$ is held for a time $t_1$. The axial feed speed pattern ② indicates that the tapping tool 13 is accelerated at the acceleration a to a predetermined axial feed speed lower than the specified axial feed speed $F_c$. The axial feed speed is held at the predetermined axial feed speed for the constant speed time T. The tapping tool 13 is fed at the constant axial feed speed for the constant speed time T for a desired tapping operation.

If the machining programs prescribes the axial feed speed pattern ① shown in FIG. 2, the axial feed speed pattern ① is modified into the axial feed speed pattern ② to secure the constant speed time T.

Figure 3A:
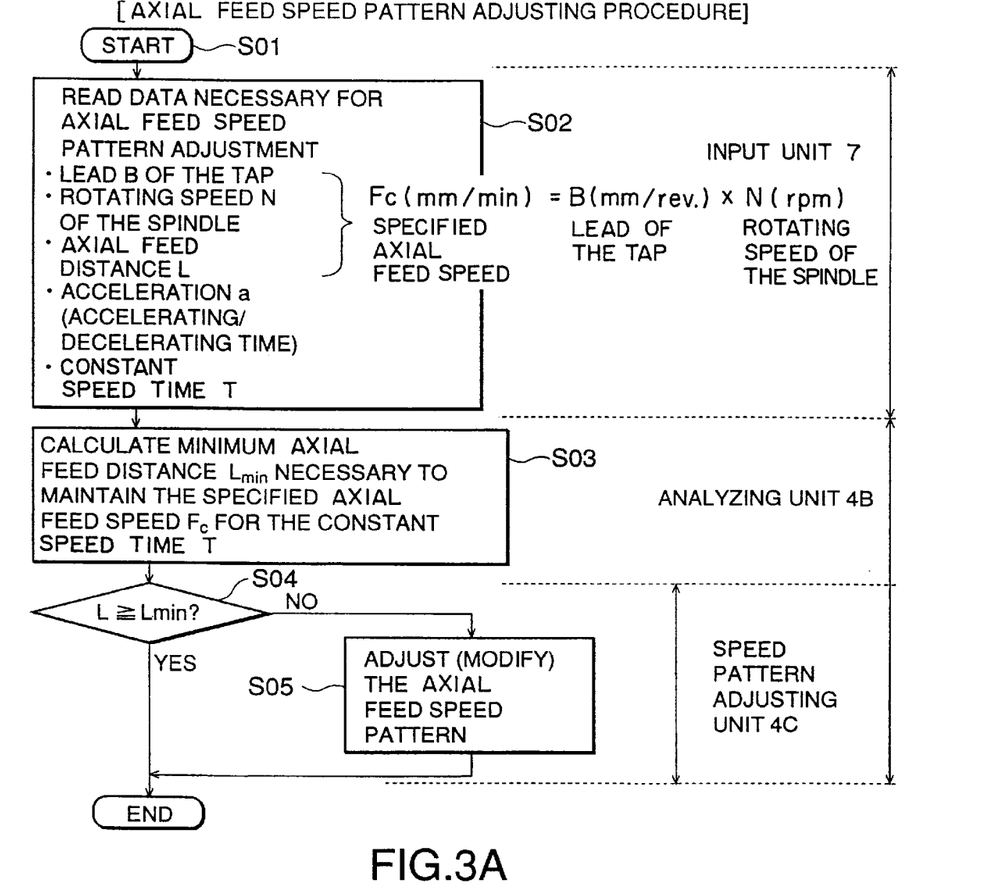
FIGS. 3A and 3B are flow charts of an axial feed speed pattern adjusting procedure to be carried out by the numerical controller of FIG. 1.
Figure 3B:
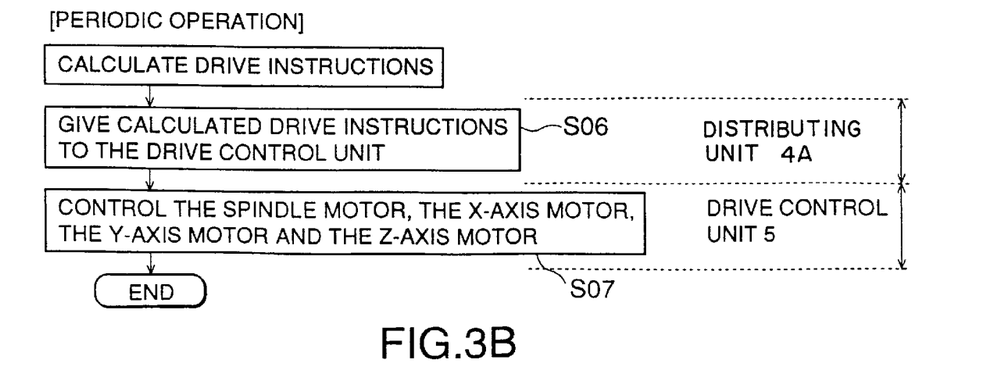

An axial feed speed pattern modifying procedure will be described with reference to a flow chart of FIG. 3A showing a procedure for an analyzing operation and a flow chart of FIG. 3B showing a procedure for a periodic operation.

Referring to FIG. 3A, a machining program prescribing machining instructions including the axial feed distance L, the rotating speed N of the spindle and the lead B of the tapping tool 13 are supplied from the direct input unit 2, the external storage 8 or the storage 6 to the input unit 7 in step S02. The specified axial feed speed $F_c$ is equal to the product of the rotating speed N of the spindle and the lead B of the tapping tool 13. System parameters including the constant speed time T, and the acceleration a or the accelerating time $t_a$ are given also to the input unit 7 in step S02. An operation for supplying those system parameters to the input unit 7 may be omitted if those system parameters are set beforehand in the input unit 7. In step S03, the analyzing unit 4B determines a specified axial feed speed $F_c$, and a minimum axial feed distance $L_{min}$ necessary for securing the constant ensuring speed time T on the basis of the machining program and the system parameters given to the input unit 7. The minimum axial feed distance $L_{min}$ can be determined, for example, by assuming an axial feed speed pattern indicating increasing the axial feed speed at the acceleration a to the specified axial feed speed $F_c$, maintaining the specified axial feed speed $F_c$ for the constant speed time T, and decreasing the axial feed speed to zero at a deceleration—a, and calculating the area of a closed area enclosed by the axial feed speed pattern and the horizontal axis.

In step S04, the analyzing unit 4B compares the calculated minimum axial feed distance $L_{min}$ with the set axial feed distance L to see if the specified axial feed speed $F_c$ can be maintained for the constant speed time T. It is determined that the constant speed time T can be maintained (i.e., if the set axial feed distance L is not shorter than the calculated minimum axial feed distance $L_{min}$), then the driving data are supplied through the distributing unit 4A to the drive control unit 5. On the other hand, if it is determined that the axial feed speed pattern needs modification (i.e., if the set axial feed distance L is shorter than the calculated minimum axial feed distance $L_{min}$), and then in step S05 the speed pattern adjusting unit 4C modifies the axial feed speed pattern. The speed pattern adjusting unit 4C adjusts the stored machining program to provide an adjusted machining program, and the tapping tool 13 is controlled for synchronous tapping operation according to the adjusted machining program. A procedure for developing the adjusted machining program is described later.

If it is decided in step S04 that the constant speed time T can be secured, the distributing unit 4A produces drive instructions for driving the spindle motor 12, the X-axis motor 16, the Y-axis motor 17 and the Z-axis motor 11 on the basis of the axial feed speed pattern prescribed in the machining program given to the input unit 7. If step S05 is executed, i.e., if it is necessary to modify the machining program produced by the user, driving signals are produced on the basis of an adjusted axial feed speed pattern prescribed in the adjusted machining program including, e.g., the adjusted specified (instructed) axial feed speed F', the constant speed time T and the set axial feed distance L which are output by the speed pattern adjusting unit 4C. In this case, the rotating speed N of the spindle is adjusted so that a synchronous tapping operation for forming an internal thread of a desired pitch and a desired length can be achieved when the tapping tool 13 is fed axially at the specified axial feed speed $F_c$. Thus, analysis is completed, and drive instructions determined as a result of the analysis are stored at predetermined locations in the drive control unit 1.

The procedure for a periodic operation is described with reference to FIG. 3B. The calculated drive instructions for driving motors such as the spindle motor 12, the X-axis motor 16, the Y-axis motor 17 and the Z-axis motor 11 are produced and then, in step S06, are given through the distributing unit 4A to the drive control unit 5. In step S07, the drive control unit 5 controls the motors according to the drive instructions for the tapping operation.

Figure 4:
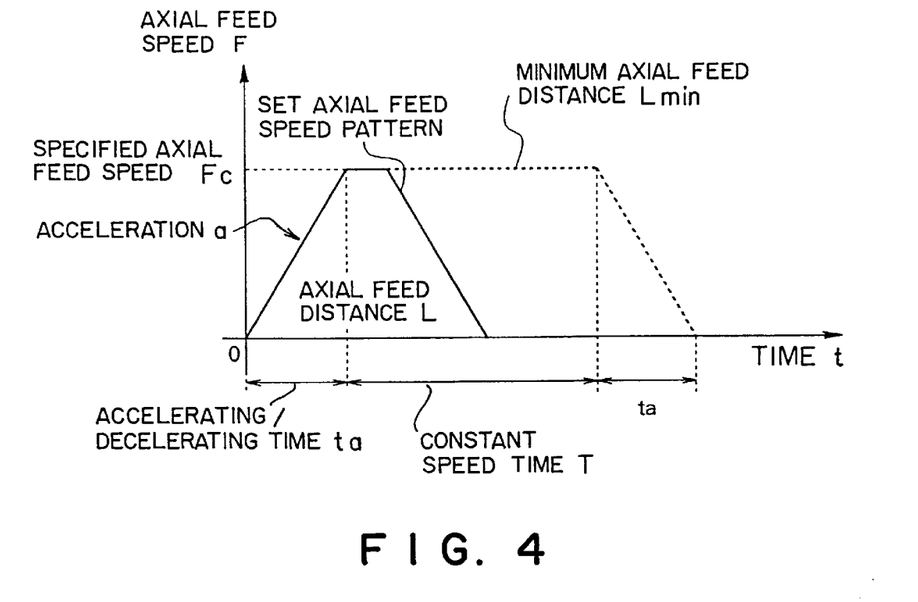
FIG. 4 is a diagram of assistance in explaining the analysis of an axial feed speed pattern including sections for constant acceleration and constant deceleration.

The procedure to be carried out by the analyzing unit 4B and the speed pattern adjusting unit 4C to develop the adjusted axial feed speed pattern which enables the synchronous tapping operation are descried hereinafter. Referring to FIG. 4 showing an axial feed speed pattern including sections for constant acceleration and constant deceleration, the minimum axial feed distance $L_{min}$ is a distance necessary to feed the tapping tool 13 at the specified axial feed speed $F_c$ for the constant speed time T. Suppose that the machining program and the system parameters including the accelerating time $t_a$, the specified axial feed speed $F_c$, the acceleration a and the deceleration –a are determined. In FIG. 4, an axial feed speed pattern prescribed in the user's machining program is indicated by continuous lines, and the minimum axial feed distance $L_{min}$ necessary to secure the constant speed time T corresponds to the area of a closed area enclosed by broken lines and the horizontal axis, which is expressed by Expression (1).

$$L_{min} = F_c(t_a + T) = F_c\left(\frac{F_c}{a} + T\right) \quad (1)$$

The analyzing unit 4B calculates the minimum axial feed distance $L_{min}$ by using Expression (1).

Figure 5:
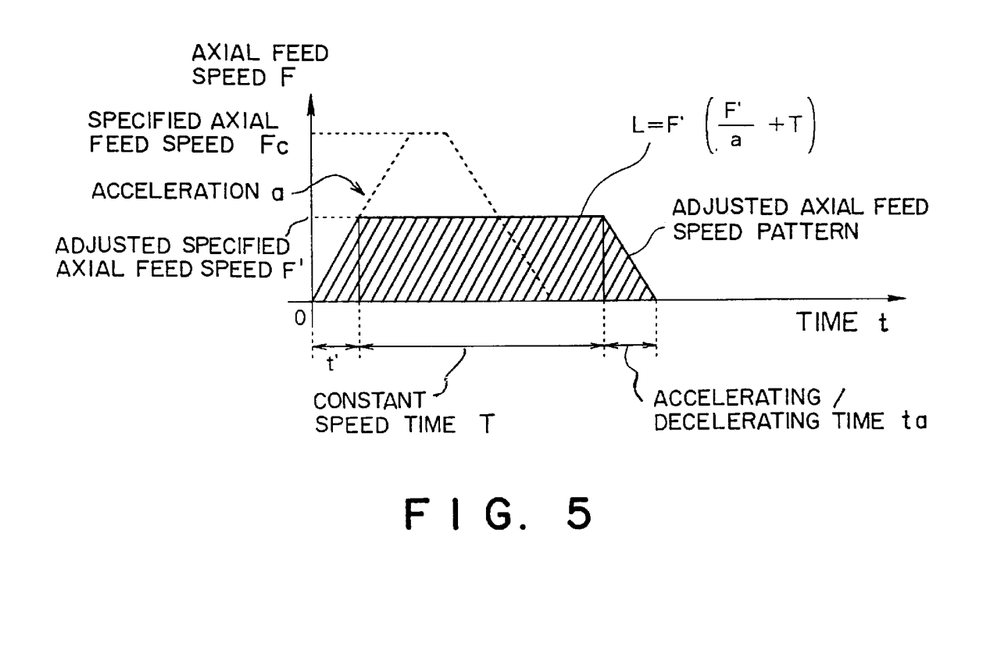
FIG. 5 is a diagram of assistance in explaining a method of changing the axial feed speed pattern including sections for constant acceleration and constant deceleration.

Referring to FIG. 5, which is of assistance in explaining a method of changing the axial feed speed pattern, if the set axial feed distance L is shorter than the minimum axial feed distance $L_{min}$, an axial feed speed pattern indicated by broken lines is modified into an axial feed speed pattern indicated by continuous lines, in which the acceleration a is not changed. An adjusted specified axial feed speed F' is expressed by Expression (2).

$$L = F'\left(\frac{F'}{a} + T\right) \quad (2)$$
$$F'^2 + aT\,F' - aL = 0$$
$$F' = \frac{-aT + a\sqrt{T^2 + 4L/a}}{2}$$
$$(F' > 0)$$

Accelerating time t' (decelerating time) for the modified axial feed speed pattern is calculated by using Expression (3).

$$t' = \frac{F'}{a} \quad (3)$$

The speed pattern adjusting unit 4C develops an adjusted machining program including the adjusted axial feed speed F', the accelerating/decelerating time t' and the acceleration a (deceleration −a) by using Expressions (2) and (3). The axial feed speed pattern is modified by the adjusted machining program, the drive control unit 5 controls the spindle motor 12, the X-axis motor 16, the Y-axis motor 17 and the Z-axis motor 11 according to the drive instructions prescribed in the adjusted machining program for a synchronous tapping operation. The rotating speed N of the spindle is controlled according to the axial feed speed for feeding the tapping tool 13 so that the synchronous tapping operation can be achieved to form an internal thread of a desired pitch and a desired length.

Figure 6A:
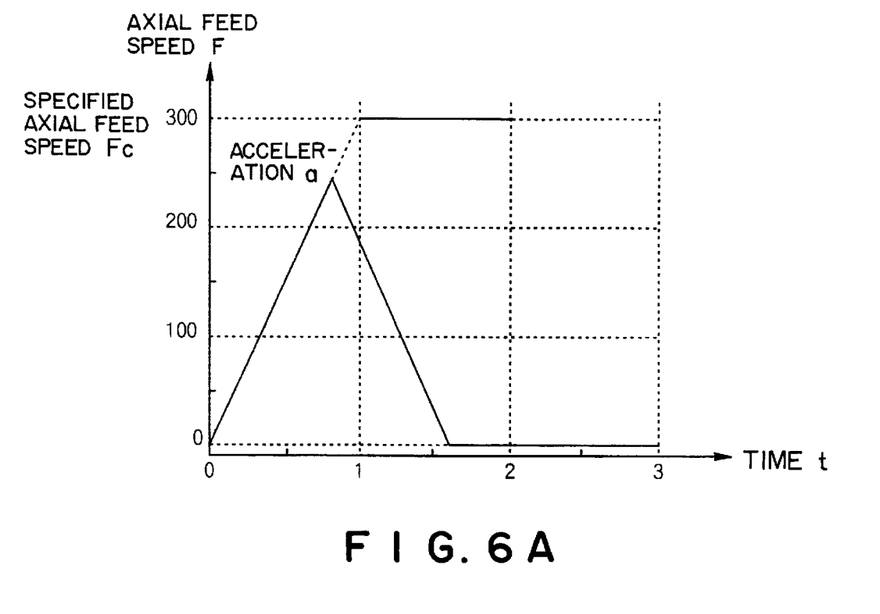
FIGS. 6A and 6B are diagrams respectively showing a first axial feed speed pattern and the variation of synchronization error with time during an axial tapping tool feed operation controlled by a conventional numerical controller.
Figure 6B:
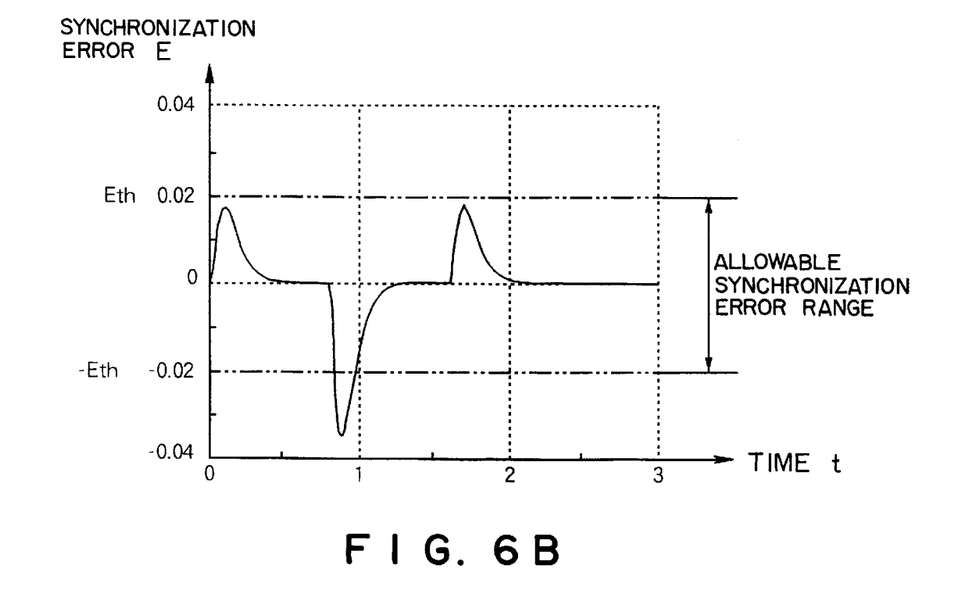

The numerical controller in this embodiment and a conventional numerical controller are described comparatively in terms of the relation between the axial feed speed pattern and synchronization error. FIGS. 6A and 6B are diagrams showing a first axial feed speed pattern and the variation of synchronization error with time during an axial tapping tool feed operation controlled by a conventional numerical controller. FIG. 6A indicates that the tapping tool 13 is fed axially at an acceleration a to a predetermined axial feed speed lower than the specified axial feed speed $F_c$, and the tapping tool 13 is decelerated immediately after the axial feed speed has reached the predetermined axial feed speed. As shown in FIG. 6B, a large negative synchronization error E exceeding a negative limit synchronization error −Eth occurs immediately after the deceleration has started and a faulty tapping operation results.

Figure 7A:
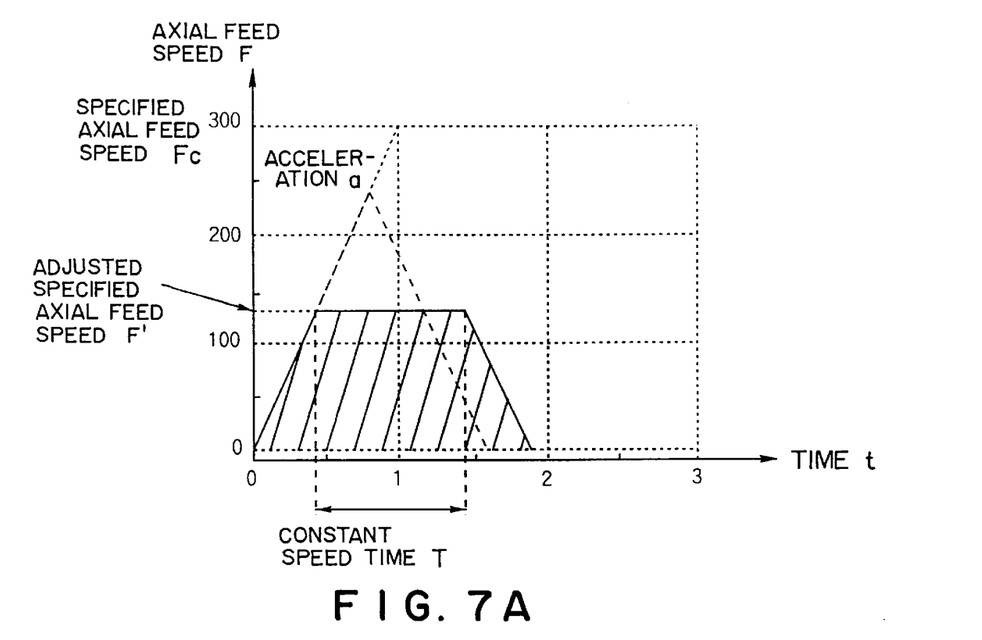
FIGS. 7A and 7B are diagrams respectively showing a adjusted axial feed speed pattern and the variation of synchronization error with time during an axial tapping tool feed operation controlled by the numerical controller of FIG. 1.
Figure 7B:
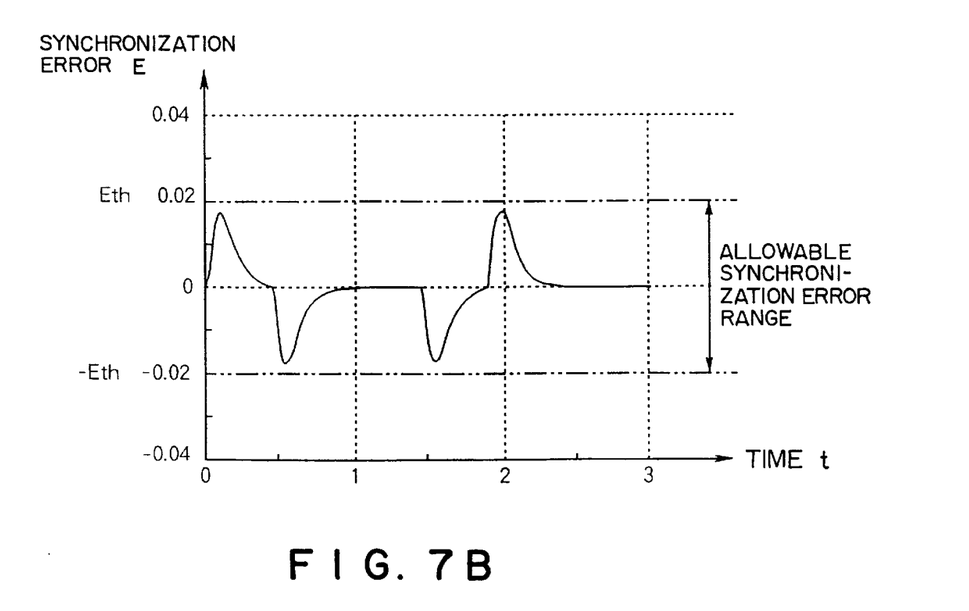

FIGS. 7A and 7B are diagrams showing a first adjusted axial feed speed pattern and the variation of synchronization error with time during an axial tapping tool feed operation controlled by the numerical controller in this embodiment. The first adjusted axial feed speed pattern shown in FIG. 7A is obtained by modifying the axial feed speed pattern shown in FIG. 6A. The adjusted axial feed speed pattern shown in FIG. 7A prescribes steps of accelerating the tapping tool 13 to an adjusted specified axial feed speed F', maintaining the adjusted specified axial feed speed F' for a constant speed time T, and decelerating the axial feed of the tapping tool 13. When the tapping tool 13 is fed according to the adjusted axial feed speed pattern shown in FIG. 7A, synchronization errors E occur at a moment immediately after the moving speed of the tapping tool 13 has reached the adjusted specified axial feed speed F' and at a moment immediately after the deceleration has been started as shown in FIG. 7B. However, the moving speed of the tapping tool 13 is not changed at a high acceleration and a high deceleration, and the synchronization errors E are relatively small and within an allowable synchronization error range of ±Eth because the adjusted axial feed speed pattern has the relatively long constant speed time T. Therefore, a faulty tapping operation does not occur. Rather, the constant axial feed duration T is secured, a correct tapping operation is achieved.

Figure 8A:
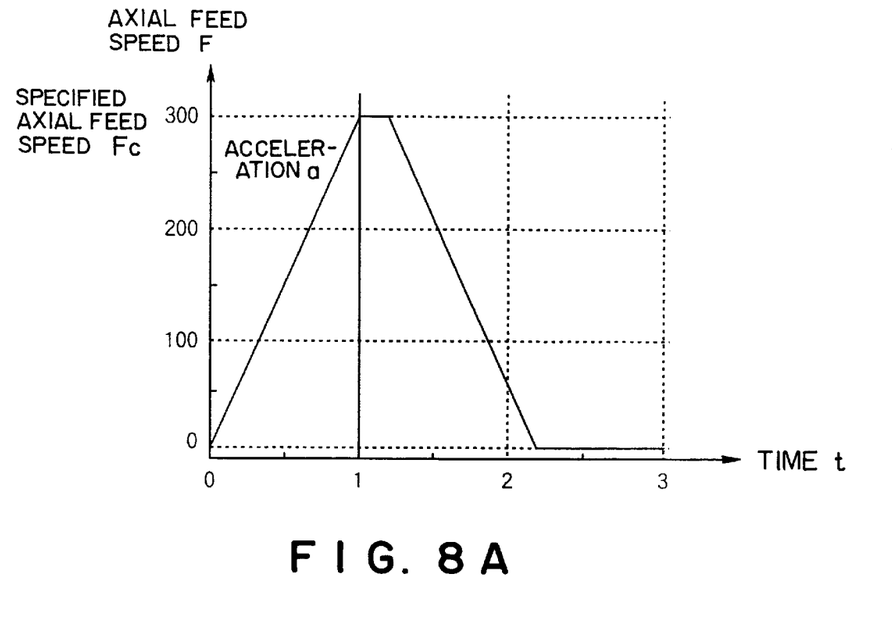
FIGS. 8A and 8B are diagrams respectively showing a second axial feed speed pattern and the variation of synchronization error with time during an axial feed operation controlled by the conventional numerical controller.
Figure 8B:
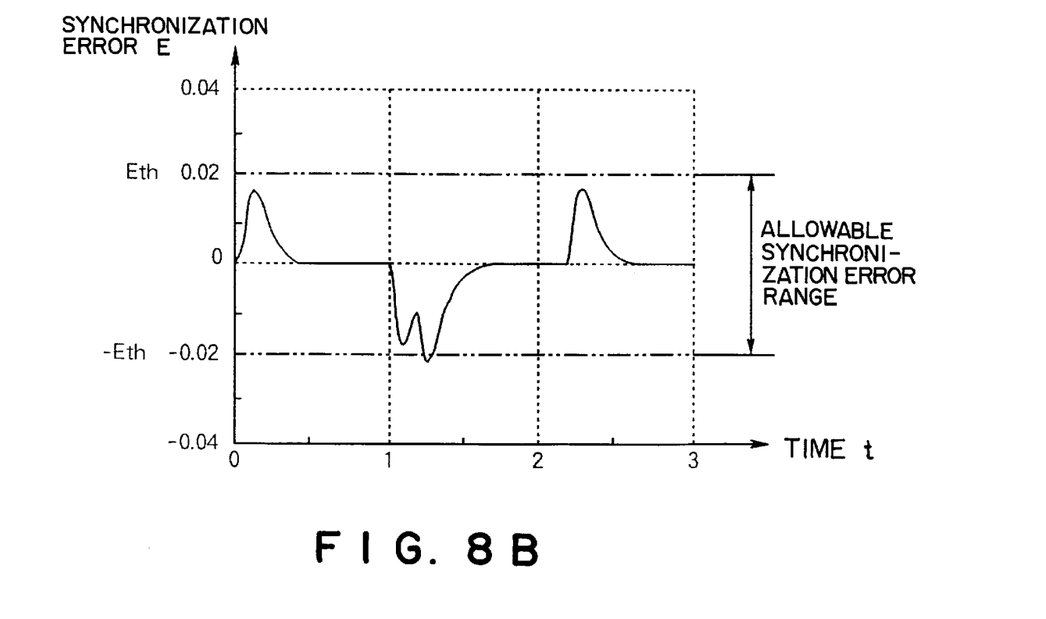

FIGS. 8A and 8B are diagrams showing a second axial feed speed pattern and the variation of synchronization error with time during an axial tapping tool feed operation controlled by the conventional numerical controller. The second axial feed speed pattern shown in FIG. 8A prescribes steps of accelerating the tapping tool 13 at an acceleration a to the specified axial feed speed $F_c$, maintaining the axial feed speed $F_c$ for a short time, and decelerating the axial feed of the tapping tool 13. If the axial feed speed of the tapping tool 13 is controlled according to the second axial feed speed pattern shown in FIG. 8A large synchronization errors E appear at a moment immediately after the axial feed speed F has increased to the specified axial feed speed $F_c$ and at a moment immediately after the start of deceleration as shown in FIG. 8B. Since the duration of the specified axial feed speed $F_c$ is short, the synchronization errors E occur successively and the synchronization error that occurs after the start of deceleration tends to increase beyond a limit synchronization error −Eth corresponding to the level of an allowable machining error, so that a faulty tapping results.

Figure 9A:
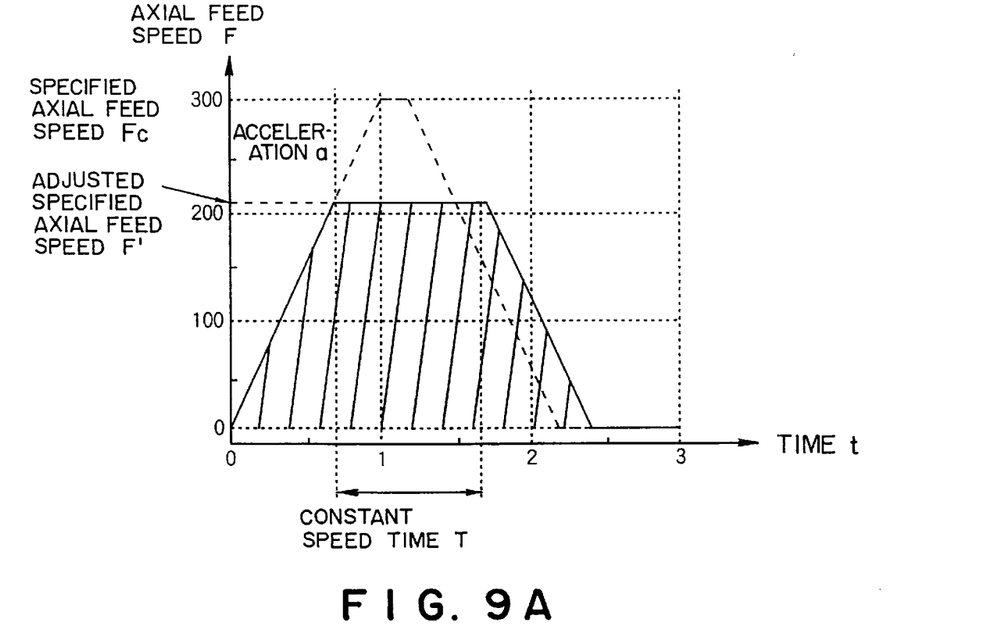
FIGS. 9A and 9B are diagrams respectively showing a second adjusted axial feed speed pattern and the variation of synchronization error, during an axial feed operation controlled by the numerical controller of FIG. 1.
Figure 9B:
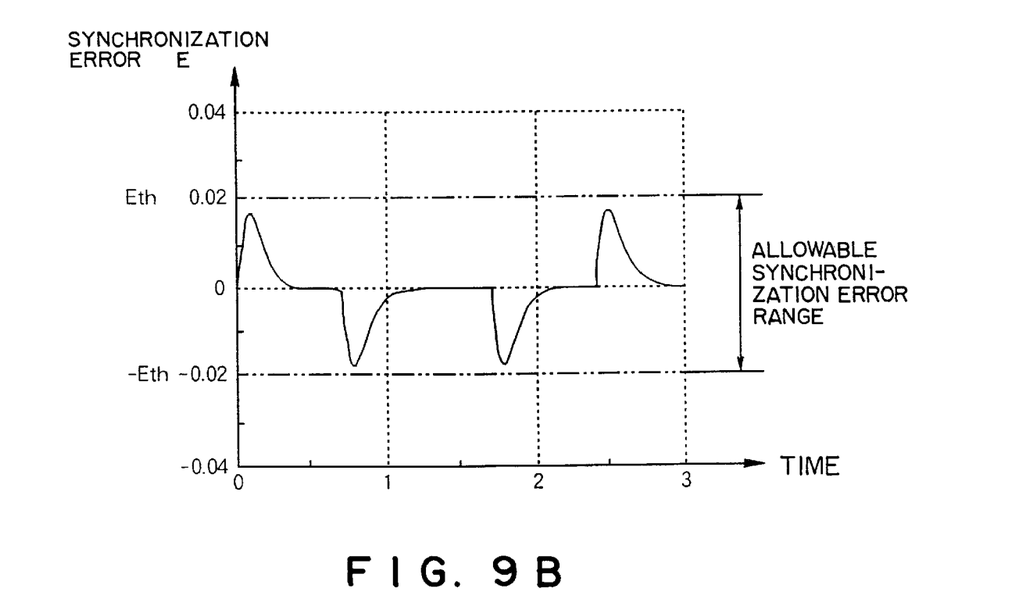

FIGS. 9A and 9B are diagrams respectively showing a second adjusted axial feed speed pattern and the variation of synchronization error during an axial feed operation controlled by the numerical controller in this embodiment.

The second adjusted axial feed speed pattern shown in FIG. 9A is obtained by modifying the second axial feed speed pattern shown in FIG. 8A. The second adjusted axial feed speed pattern prescribes steps of accelerating the tapping tool 13 at an acceleration a to an adjusted specified axial feed speed F', maintaining the adjusted specified axial feed speed F' for a predetermined time, and decelerating the axial feed of the tapping tool 13. If the axial feed speed of the tapping tool 13 is controlled according to the second adjusted axial feed speed pattern, synchronization errors E appear at a moment immediately after the axial feed speed F has increased to the adjusted specified axial feed speed F' and at a moment immediately after the start of deceleration as shown in FIG. 9B. But the duration of the adjusted specified axial feed speed F' is relatively long, the synchronization errors E are relatively small and are within an allowable synchronization error range of ±Eth. Accordingly, faulty tapping does not occur and, since the constant speed time T is secured, a correct tapping operation can be achieved.

There are some cases where precision machining is required, the allowable machining error range is narrower than the synchronization error range of ±Eth and the level of the synchronization error is higher than that of the machining error even if a tapping tool feed operation is controlled according to the adjusted axial feed speed pattern as shown in FIG. 7A or 9A. However, the constant speed time T in the adjusted axial feed speed patterns shown in FIGS. 7A and 9A is long enough to ensure a correct tapping operation.

Although it is assumed that the tapping tool 13 is accelerated in a constant acceleration mode for simplicity in the foregoing description of the embodiments, the numerical controller of the present invention may accelerate the tapping tool 13 in any one of various acceleration modes other than, or in addition to, the constant acceleration mode. When accelerating the tapping tool 13 in an acceleration mode other than the constant acceleration mode, the analyzing unit 4B determines the minimum axial feed distance $L_{min}$ by integration and the speed pattern adjusting unit 4C adjusts the axial feed speed pattern to secure the constant speed time.

A comparative observation of FIGS. 6 and 8, and FIGS. 7 and 9 demonstrates that the employment of the "constant speed time T" as an additional system parameter reduces the peak values of synchronization error.

According to the present invention, an accurate high-quality synchronous machining operation, such as a synchronous tapping operation, can be achieved without being affected by the user's machining program prescribing the set axial feed distance and the specified axial feed speed.

Although the invention has been described in its preferred form with a certain degree of particularity, many changes and variations are possible therein. It is therefore to be understood that the present invention may be practiced otherwise than as specifically described herein without departing from the scope and spirit thereof.

What is claimed is:

1. A numerical controller for controlling a machine tool that feeds a tool in an axial direction of a spindle synchronously with a rotation of the spindle for machining a work piece, said numerical controller comprising:

an input unit for inputting machining instructions specifying an axial feed speed pattern and including an axial feed distance of the spindle, and for setting system parameters including a time for ensuring that an axial feed speed of the spindle remains constant;

an analyzing unit for determining a minimum feed distance necessary for machining based on said machining instructions and said system parameters, and for comparing said axial feed distance included in said machine instructions with the minimum feed distance, said analyzing unit comprising a calculating means for determining the minimum axial feed distance by calculating an axial feed distance based on the axial feed speed pattern in which the tool is accelerated at an acceleration a to a specified axial feed speed $F_c$, the specified axial feed speed $F_c$ is maintained for a constant speed time T, and the tool is decelerated at a deceleration $-a$;

a speed pattern adjusting unit for changing the axial feed speed pattern specified by the machining instructions to an adjusted axial feed speed pattern having a constant speed time longer than said time for ensuring that the axial feed speed of the spindle remains constant based on a result of said comparison made by the analyzing unit;

a distributing unit for calculating and outputting driving instructions according to said adjusted axial feed speed pattern generated by said speed pattern adjusting unit based on the result of said comparison made by the analyzing unit; and a drive control unit for controlling a driving unit based the driving instructions output by said distributing unit.

2. The numerical controller according to claim 1, wherein the drive control unit controls a predetermined driving mechanism included in the driving unit according to the drive instructions provided by the distributing unit.

3. The numerical controller according to claim 1, wherein the speed pattern adjusting unit develops an adjusted axial feed speed pattern securing the constant speed time T without changing the acceleration a by modifying the axial feed speed pattern when a set axial feed distance L is shorter than the minimum axial feed distance $L_{min}$, and the adjusted specified axial feed speed F' and the accelerating/decelerating time t' meets the following expressions $$F' = \frac{-aT\sqrt{T^2 + 4L/a}}{2}$$

$$t' = F'/a$$

4. The numerical controller according to claim 1, wherein the distributing unit calculates drive instructions for instructing a drive control unit to control drive shafts so that the tool is fed axially in synchronism with the rotation of the spindle, on the basis of an adjusted specified axial feed speed F', accelerating/decelerating time t', an acceleration a and an axial feed distance L calculated by the speed pattern adjusting unit, and gives the drive instructions to the drive control unit.

5. The numerical controller according to claim 1, further comprising an external storage, an internal storage or a direct input unit for setting the machining instructions and the system parameters in the input unit.

6. A numerical controller for controlling a machine tool that feeds a tool in an axial direction of a spindle synchronously with a rotation of the spindle for machining a work piece, said numerical controller comprising:

an input unit for inputting machining instructions including an axial feed distance of the spindle, a rotating speed of a spindle and a lead of a tap, and for setting system parameters including a time for ensuring that an axial feed speed remains constant, and a time for accelerating/decelerating or an acceleration of the axial feed of the spindle;

an analyzing unit for determining a minimum axial feed distance necessary for satisfying the time for ensuring that the axial feed speed remains constant, by using an instructed axial feed speed calculated from said rotating speed and said lead of the tap included in said machining instructions and by using said time for accelerating/decelerating or said acceleration included in said system parameters, and for comparing said axial feed distance set in the input unit with the minimum axial feed distance, said analyzing unit comprising a calculating means for determining the minimum axial feed distance by calculating an axial feed distance based on the axial feed speed pattern in which the tool is accelerated at an acceleration a to a specified axial feed speed $F_c$, the specified axial feed speed $F_c$ is maintained for a constant speed time T, and the tool is decelerated at a deceleration $-a$;

a speed pattern adjusting unit for determining an adjusted axial feed speed pattern by calculating an adjusted machining instruction including an adjusted axial feed instructing speed based on said machining instructions and said system parameters in order to obtain the time for ensuring that the axial feed speed remains constant, in a case where said axial feed distance based on the axial feed speed pattern by said machining instructions is smaller than said minimum feed distance;

a distributing unit for making and outputting drive instructions that execute an axial feed of a spindle synchronously with a rotation of the spindle based on said adjusted axial feed speed pattern determined by said speed pattern adjusting unit in a case where said axial feed distance is larger than said minimum feed distance, or based on another case where said axial feed distance is smaller than said minimum feed distance; and a drive control unit for controlling a driving unit based on the driving instructions output by said distributing unit.

* * * * *